(12) United States Patent
Contreras et al.

(10) Patent No.: US 7,925,442 B2
(45) Date of Patent: Apr. 12, 2011

(54) PSEUDO LOGS TO IMPROVE STRATIGRAPHIC CORRELATION BETWEEN SEDIMENTARY BASINS

(75) Inventors: Arturo Javier Contreras, Houston, TX (US); Rebecca Buxton Latimer, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 357 days.

(21) Appl. No.: 12/250,632

(22) Filed: Oct. 14, 2008

(65) Prior Publication Data

US 2010/0094559 A1   Apr. 15, 2010

(51) Int. Cl.
   *G01V 1/28* (2006.01)
(52) U.S. Cl. .......................................... 702/4
(58) Field of Classification Search ............... 702/14
   See application file for complete search history.

(56) References Cited

U.S. PATENT DOCUMENTS

2010/0138157 A1* 6/2010 Sun et al. ........................ 702/6

OTHER PUBLICATIONS

Rebecca Buxton Latimer, Rick Davison, Jason Geosystems, Paul Can Riel and Jason Geogsystems; An interpreter's guide to understanding and working with seismic-derived acoustic impedance data; Mar. 2000; pp. 242-256.

* cited by examiner

*Primary Examiner* — Tung S Lau
(74) *Attorney, Agent, or Firm* — Carlos L. Hanze

(57) ABSTRACT

In order to improve the tie between depositionally equivalent beds relative to two or more basins detected within a multi dimensional seismic volume of interest, pseudo logs based on the average of attributes derived from seismic impedance where the compaction trend is not present are created for each basin. The mean is taken over all available azimuths, following the structural variations of introduced micro layers. The correlation between the pseudo log relative to each basin enable a more reliable interpretation between the different basins from which sound exploration decision can be made. Such a process has been successfully applied to seismic data acquired in deep water environment.

12 Claims, 12 Drawing Sheets

PSEUDO LOGS TO IMPROVE STRATIGRAPHIC CORRELATION BETWEEN SEDIMENTARY BASINS

FIELD OF THE INVENTION

The invention relates to the creation of pseudo logs based on attributes derived from seismic impedance data to improve the correlation of depositionally equivalent beds between two or more basins.

BACKGROUND OF THE INVENTION

One of the first steps in hydrocarbon exploration is to generate a consistent stratigraphic framework by interpretation of the post stack processed seismic volume to be explored. This includes the identification of depositionally equivalent beds.

In some structurally complex regions, such as deep water depositional environments, this first step may prove challenging because of the structural complexity which can cause differential deposition (i.e., varying thickness) and stratigraphic unconformities or discontinuities between beds with common times of deposition. By way of example, where a seismic volume includes two or more separate basins, beds and/or horizons bounding the beds within the separate basins may have been deposited at the same time, but correlation between such beds may be difficult to determine because of the unconformities, discontinuities (missing sections) or variable thicknesses between the basins.

Conventional techniques exist for analyzing seismic data and correlating between (i.e., tieing) separate basins. These techniques include identifying and correlating features such as surfaces (beds) and events located in the separate basins that have common times of deposition. However, the accuracy of these techniques in correlating stratigraphically equivalent events may be incorrect and/or lacking in some instances.

The definitive methodology for determining an accurate tie between basins is drilling a well in each basin, logging the well and sampling the data from the well bore. This is time intensive and expensive in terms of equipment and man hours.

SUMMARY

One aspect of the invention relates to a system and method for providing correlation between depositionally equivalent subsurface events between separate basins. In one embodiment, the provision of correlation between depositionally equivalent subsurface events is accomplished by operations comprising (a) obtaining a set of seismic amplitude data representing a seismic volume of interest acquired in a deep water environment, wherein the dimensions of the set of seismic data are (i) a two-dimensional position on a surface plane of the seismic volume of interest, (ii) a parameter related to seismic time and (iii) a parameter related to the amplitude derived from the signal arriving at a point in the data set defined by (i) and (ii); (b) identifying a plurality of basins in the volume of seismic amplitude data, the plurality of basins including a first basin and a second basin; (c) obtaining values for an impedance parameter related to one or both of acoustic and/or elastic impedance for locations within the volume of seismic data; (d) identifying stratigraphic layers within the first basin; (e) identifying stratigraphic layers within the second basin; (f) introducing micro-layers in between and/or within the stratigraphic layers identified in (d) for the first basin and (e) for the second basin, (g) taking the mean of the impedance parameter within each micro layer; (h) obtaining a pseudo log for each of the first basin and the second basin including the mean values obtained at (g); (i) correlating the pseudo log for the first basin with the pseudo log for the second basin; and (j) adjusting an interpretation regarding the continuity of the layers between the first basin and the second basin based on the correlation performed at (i).

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The dimensions of seismic amplitude data representing a seismic volume of interest generally include position along a horizontal surface (or some other surface) and a parameter related to seismic time or seismic depth. Where the seismic data is three-dimensional (e.g., a seismic "data cube"), the position along a horizontal surface may be parameterized by a pair of positional parameters that describe position on a surface plane of the corresponding seismic volume of interest (e.g., an x-y position along a horizontal plane), with the amplitude of the seismic data arranged along an axis perpendicular to the surface plane of reference.

Figure 1:
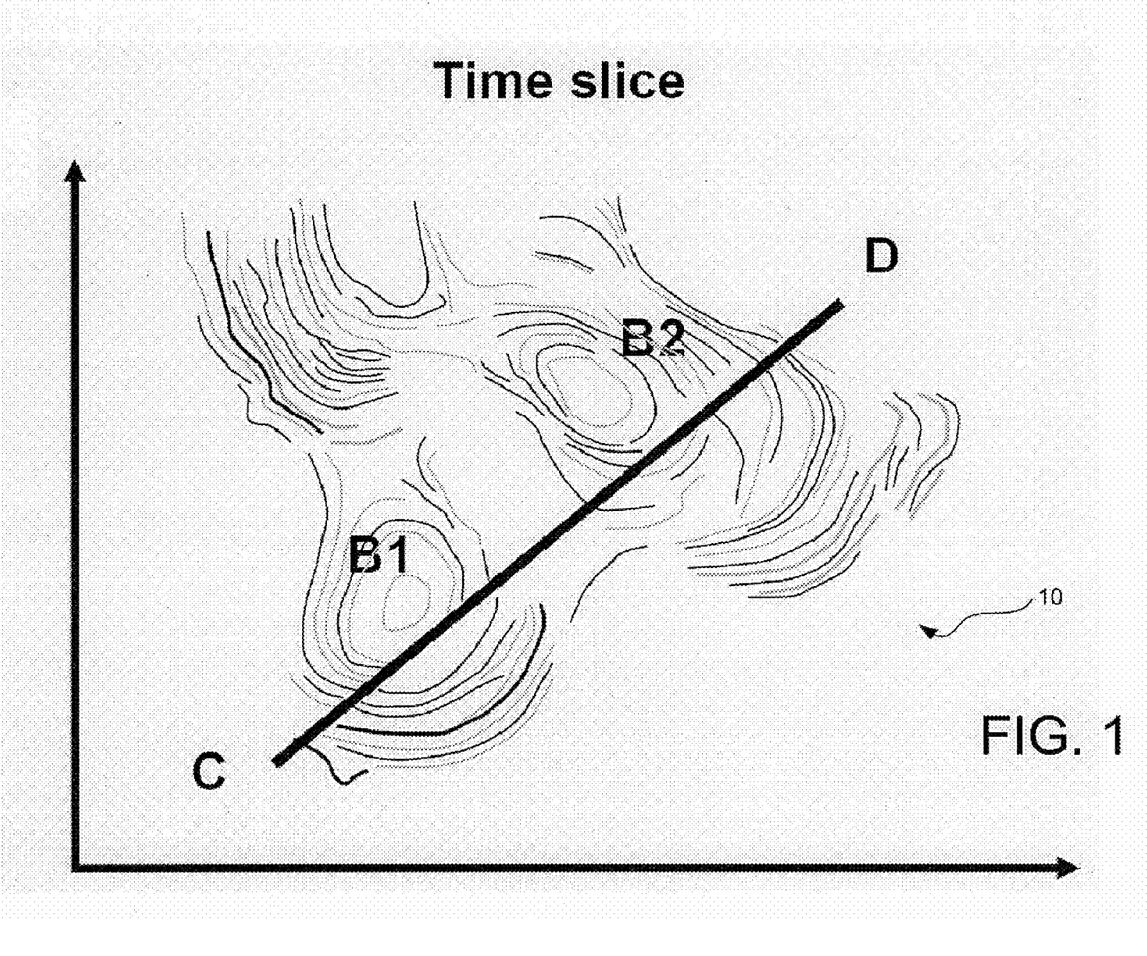
FIG. 1 illustrates a time slice of a set of seismic amplitude data, according to one or more embodiments of the invention.

FIG. 1 illustrates a view of a seismic data cube 10 representing a seismic volume of interest taken along a single value for the parameter related to seismic time (e.g., a horizontal slice through seismic data cube 10). Generally, this type of view is known as a "time slice." As can be seen, the seismic volume of interest includes two separate basins, labeled in FIG. 1 as a first basin B1 and a second basin B2. Although, first basin B1 and second basin B2 are illustrated as being directly adjacent, this is not intended to be limiting. The principles discussed below with respect to first basin B1 and second basin B2 could be applied to any two or more basins (or sub-basins) located within a common depositional environment. In the illustration provided in FIG. 1, seismic data cube 10 depicts a seismic volume of interest (including first basin B1 and second basin B2) disposed within a common deep water depositional environment. Although some aspects of the analysis discussed with respect to seismic data cube 10 are specific to this setting, it should be appreciated that the principles described below may be applied generically within other depositional settings where continuous and homogeneous layers can be identified, such as chalk for example. The scope of this disclosure includes analysis of seismic data obtained from these other depositional settings performed in accordance with the principles described.

Figure 2:
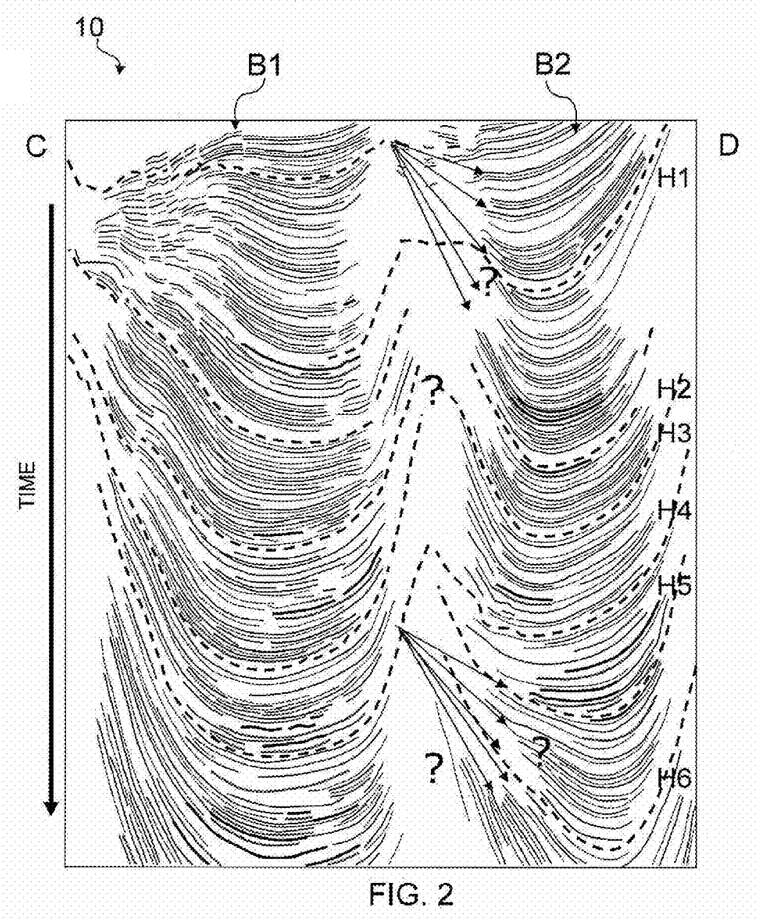
FIG. 2 illustrates a cross-sectional view of a line of seismic amplitude data crossing two basins, according to one or more embodiments of the invention.

FIG. 2 illustrates a sectional view of data cube 10 taken along section line C-D shown in FIG. 1. In the description below, various properties illustrated in the two-dimensional view of data cube 10 shown in FIG. 2 are discussed. It should be apparent that these properties apply not only to the two-dimensional section shown in FIG. 2, but throughout the three-dimensional data cube 10, and that the discussion of these properties with respect to the two dimensions shown is for illustrative purposes only. Further, it should be appreciated that the discussion below regarding the analysis performed in three dimensions could be applied to a two dimensional data set describing the subsurface structure of a single cross-section of the seismic volume of interest.

In the view of data cube 10 shown in FIG. 2, it can be seen that the seismic volume of interest includes a plurality of horizons, labeled in FIG. 2 as H1-H6. A horizon is a surface formed at a boundary between two layers of differing composition within the strata of a seismic volume of interest. Since horizons H1-H6 represent boundary changes in the composition of the strata of the seismic volume of interest, it is assumed for analysis purposes that each horizon H1-H6 represents a surface within the seismic volume of interest that delineate geologic layers deposited at a common chronostratigraphic time. This is reasonable because the impetus for a composition change in the strata being deposited in one area of the seismic volume of interest would likely be an impetus for a similar change in the composition of strata being deposited in another area of the seismic volume of interest. Particularly, where the boundaries indicating such a change in composition for both areas connect and/or are of similar depth within the seismic volume of interest.

Figure 3:
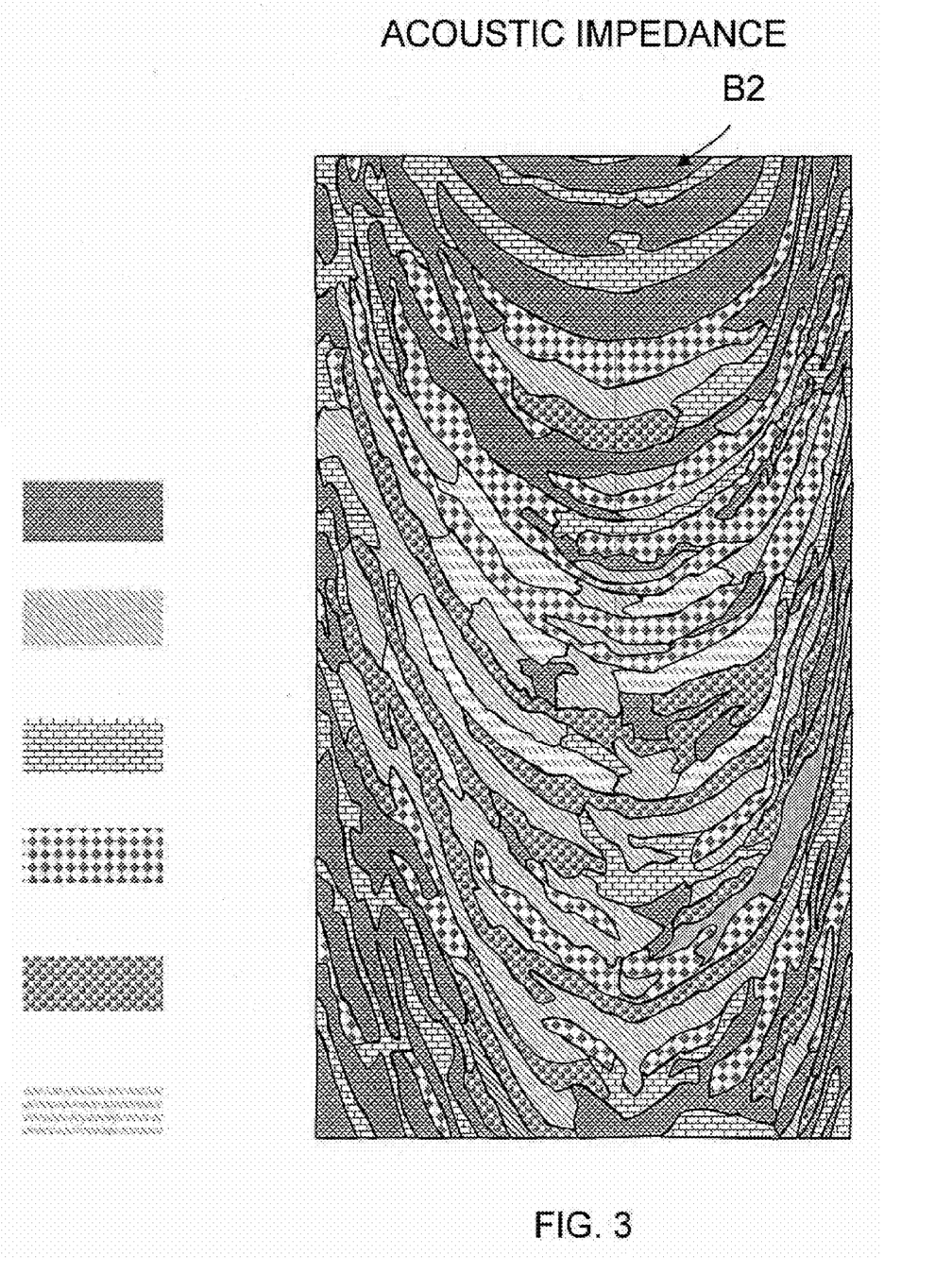
FIG. 3 illustrates a view of acoustic impedance data derived from a set of seismic amplitude data, in accordance with one or more embodiments of the invention.

FIG. 3 is a depiction of acoustic impedance data that corresponds to a portion of the second basin B2. Acoustic impedance provides a metric related more directly to the layer properties within the seismic volume of interest, in contrast to the seismic amplitude data that primarily indicates boundaries between the beds. FIG. 3 illustrates the manner in which beds having similar rock properties are arranged in layers, and how the boundaries of these layers form horizons H1-H6 shown in FIG. 2.

Figure 4A:
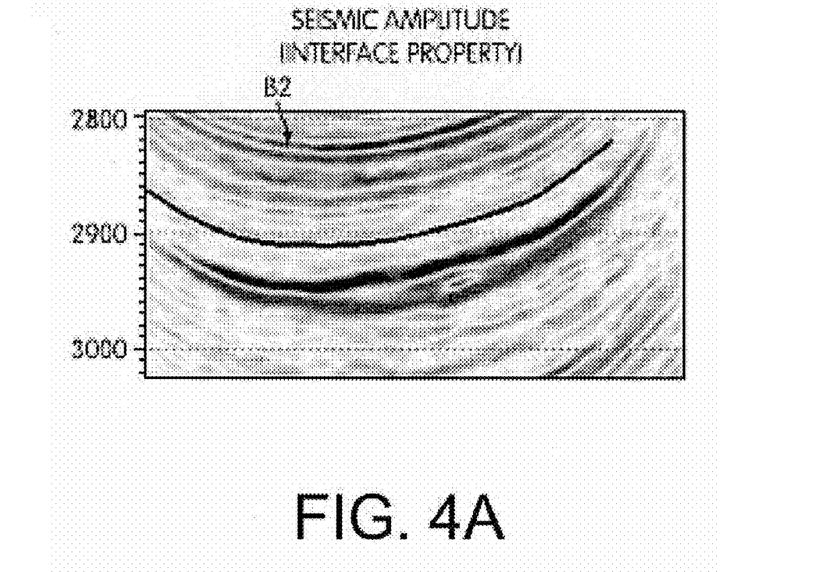
FIG. 4 illustrates a line of seismic amplitude data 4A and acoustic impedance data 4B related to the same portion of the seismic volume of interest, in accordance with one or more embodiments of the invention.
Figure 4B:
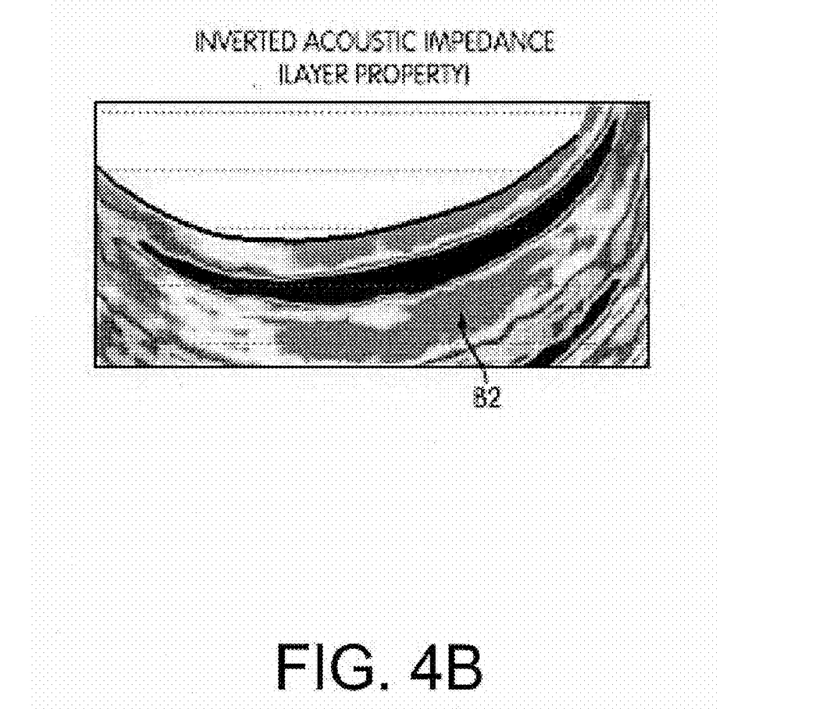

FIGS. 4A and 4B illustrate the relationship between seismic data and acoustic impedance. FIGS. 4A and 4B show two data sets depicting a portion of the section of data cube 10 of second basin B2 shown in FIGS. 2 and 3. In the first data set, FIG. 4A, formed from seismic amplitude data, a bed having common rock properties appears as a pair of adjacent, and separate, horizons. By contrast, in the data set formed from acoustic impedance, FIG. 4B, the same bed is shown as a single unit having common rock properties, and being bounded on each side by the horizons shown in the first data set. Acoustic impedance is obtained through inversion of seismic data. Inversion is a known process, and can be performed, for example, on post-stack data, angle stack data, and/or other seismic data.

Referring back to FIG. 2, not only do horizons H1-H6 within second basin B2 correspond to individual chronostratigraphic times, but other basins in the same depositional environment will also include horizons that correspond to one or more of H1-H6. This is because the other basins in the same depositional environment as second basin B2 will have been subjected to some of the same drivers of sediment deposition as second basin B2. By way of illustration, FIG. 2 shows a set of horizons present in the first basin B1, some of which may correspond to horizons H1-H6 in the second basin B2. Correlating such horizons, and the layers they bound, between first basin B1 and second basin B2 is desirable for a variety of reasons. For example, it ensures the proper identification of the same layer in each basin. Such identification is then used to make drilling decisions that encompass several millions of dollars. However, as can be seen in FIG. 2, a cursory inspection of data cube 10 does not enable horizons within first basin B1 and horizons H1-H6 in second basin B2 that were deposited at common chronostratigraphic times to be correlated because corresponding horizons and layers within basins B1 and B2 may be found at different points along the dimension of the seismic parameter of data cube 10.

In order to correlate horizons and/or layers in the first basin B1 and the second basin B2, geologic markers common to both the first basin B1 and the second basin B2 are identified and correlated between the basins B1 and B2. The geologic markers discussed below, referred to as condensed sections, are specific to deep water depositional environments. This is not intended to be limiting, and the methodology discussed below is applicable to identify other types of geologic markers found within other depositional environments.

Figure 5:
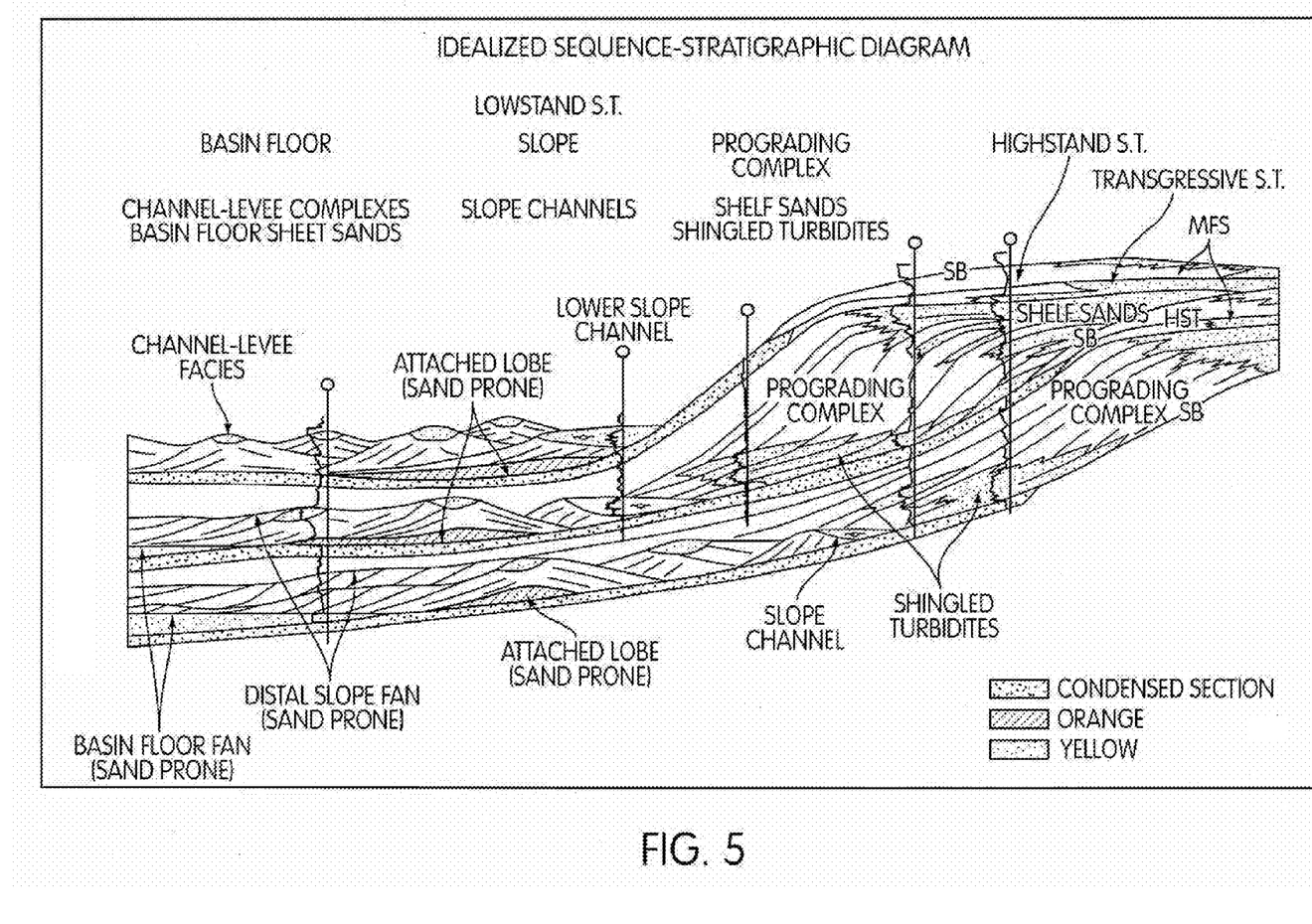
FIG. 5 illustrates a diagram showing a deep water depositional environment, according to one or more embodiments of the invention.

FIG. 5 provides an illustration of an exemplary deep water depositional environment. Generally in deep water depositional environments (e.g., in the deposition of basins B1 and B2), material that is deposited within a basin is derived from sands, shales, and debris eroded from the neighboring shelf margin. These materials may be deposited by streams and deltas flowing into the deeper water. When sea level is relatively low, material is eroded from the continent and/or the shelf margin, and a relatively large amount of material (sands or shales) is deposited into the deep water basins. When sea level is high, less material is eroded from the shelf margins and therefore less is deposited into the basins. Typically, the materials that are deposited into the basin at high sea levels (high stand) are very fine scale materials such as fine organics and silts. The deposition is very slow, but relatively consistent; making a very thin layer of mud and organic debris. This fine organic rich material creates a relatively homogeneous thin layer within all basins affected by the sea level rise. The layer has similar rock properties and is regional in its extent. The layers formed in this manner during periods of high sea levels are referred to as "condensed sections."

Condensed sections are typically regional in extent, and their homogeneous rock properties exhibit similar characteristics on seismic amplitude data. As such, condensed sections provide geologic markers for use in identifying the type of sediments (sands vs shales) and in correlating between separate basins. Identifying the condensed sections within each of basins B1 and B2 enables the corresponding seismic volumes to be "tied" together. When correlated accurately, those skilled in the art should understand the timing of the deposition of each basin, which will in turn enable a reconstruction of the depositional history of one or both of basins B1 and/or B2. Consistent depositional events similar to those found in the deep water could also exist in other depositional environments in a regional area. Therefore, the description of the identification and correlation of geological markers consisting of condensed sections provided herein is not intended to be limiting, and the methodology discussed below could be adapted to identify other types of geologic markers found within other depositional environments.

Figure 6:
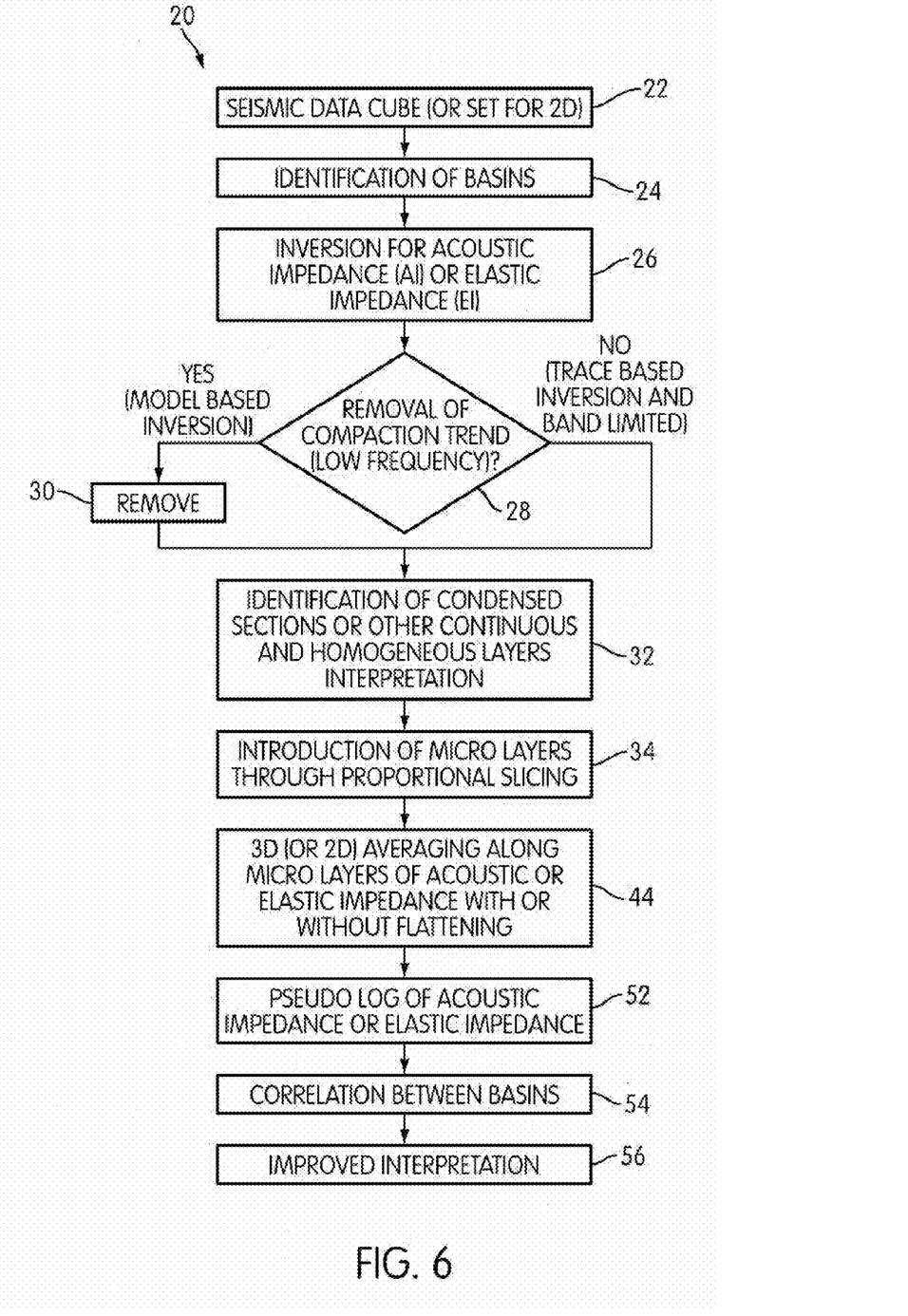
FIG. 6 illustrates the workflow used in this invention to tie a seismic volume of interest together by correlating layers within separate basins that have common times of deposition, in accordance with one or more embodiments of the invention.

FIG. 6 illustrates a method 20 of tying a seismic volume of interest together by correlating layers within separate basins that have common times of deposition. The operations of method 20 presented below are intended to be illustrative. In some embodiments, method 20 may be accomplished with one or more additional operations not described, and/or without one or more of the operations discussed. Additionally, the order in which the operations of method 20 are illustrated in FIG. 6 and described below is not intended to be limiting.

In some embodiments, method 20 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more modules executing some or all of the operations of method 20 in response to instructions stored electronically on an electronic storage medium. The one or more processing modules may include one or more devices configured through hardware, firmware, and/or software to be specifically designed for execution of one or more of the operations of method 20.

In one embodiment, method 20 includes an operation 22, at which a set of seismic data representing a seismic amplitude data volume of interest is obtained. The dimensions of the set of seismic data include a pair of positional parameters that describe position on a surface plane of the seismic volume of interest (e.g., an x-y position along a horizontal plane), and a parameter related to seismic time arranged along an axis that is orthogonal to the surface plane. The parameter related to seismic time may include, for example, seismic time or seismic depth. The set of seismic data also includes one or more parameters related to the propagation and/or reflection of seismic energy within the seismic volume of interest, such as, for example, amplitude, frequency, phase, and/or other parameters. As such, in one embodiment, the set of seismic amplitude data is a seismic data cube representing the volume of interest. In another embodiment, the set of seismic amplitude data is reduced to a single coordinate in the horizontal surface resulting in a two dimensional data set.

At operation 24, a plurality of basins within the seismic amplitude data volume of interest is identified. In one embodiment, the plurality of basins includes a first basin and a second basin.

At operation 26, values for an impedance parameter related to one or both of acoustic impedance and/or elastic impedance are determined for locations within the seismic volume of interest. These values are determined through inversion of the seismic amplitude included in the set of seismic data. The impedance parameter may include acoustic impedance or elastic impedance, and/or other parameters related to acoustic impedance and/or elastic impedance.

At operation 28, a determination is made as to whether the inversion of seismic data to determine values for the impedance parameter at operation 26 was model-based or trace-based is made. If the determination was model-based, then method 20 proceeds to an operation 30, at which the low frequency component (i.e., the compaction trend) is removed. If the determination at operation 26 was trace-based, then method 20 proceeds to an operation 32.

At operation 32, stratigraphic layers in the seismic volume of interest that are represented in the set of seismic data, are interpreted. This includes interpreting stratigraphic layers in the plurality of basins identified at operation 24. In one embodiment, operation 32 includes interpreting stratigraphic layers in the seismic volume of interest through analysis of the impedance parameter as a function of position within the set of seismic data, as determined at operation 26. In one embodiment, operation 32 includes interpreting horizons directly from the set of seismic data. Interpreting a given stratigraphic layer at operation 32 includes interpreting an upper layer boundary and a lower layer boundary, and associating locations represented in the set of seismic data that are between the upper layer boundary and the lower layer boundary with the given layer. It may also include a first interpretation regarding the correspondence of the stratigraphic layers between each basin.

Figure 7:
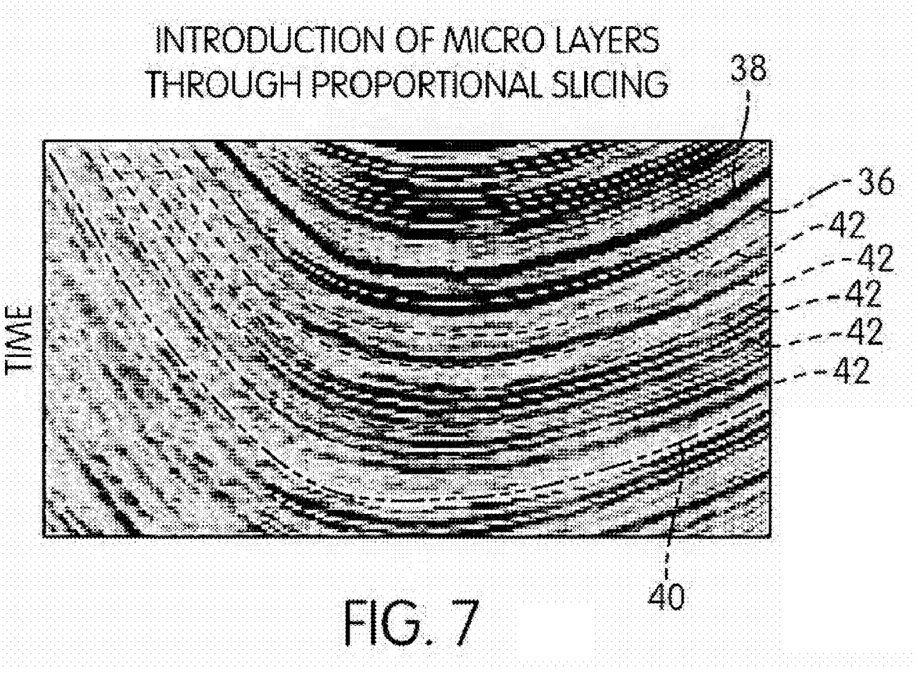
FIG. 7 illustrates a section of a set of seismic amplitude data showing surfaces mapped along similar stratigraphic events then used to introduce microlayers, according to one or more embodiments of the invention.

At operation 34, in the zone of interest, a plurality of non-intersecting surfaces are introduced between and eventually within each of the layers identified at operation 32. Surfaces can also be introduced above the top of the shallowest stratigraphic layer identified at operation 32 and/or below the bottom of the deepest stratigraphic layer identified at operation 32. Surfaces may not need to be introduced within each or any of the stratigraphic layers identified at operation 32 depending on their thickness. For purposes of illustration, FIG. 7 shows a section of a set of seismic amplitude data where the surface 36 delineates a condensed section while the surface 40 is above another condensed section. The plurality of non-intersecting surfaces with the reference numeral 42 defines micro layers, similarly to the surfaces 36, 38 and 40. As can be seen in FIG. 7, surfaces 42 are distributed somewhat uniformly and the shapes of the individual surfaces 42 are determined to maintain a somewhat proportional distance between adjacent surfaces 42. As such, the shapes of surfaces 42 correspond in some regard to upper boundary 38 and lower boundary 40. Generally, surfaces 42 are interpreted at intervals that correspond (at least roughly) to the time sampling rate of the set of seismic data (e.g., 4 milliseconds). However, surfaces 42 may be interpreted at larger intervals, such as an integer multiple of the time sampling period in some circumstances (e.g., when the seismic data are noisy or of poor quality). Such an operation is referred to by those skilled in the art as proportional slicing and the intermediate surfaces are referred to as micro layers.

Figure 8A:
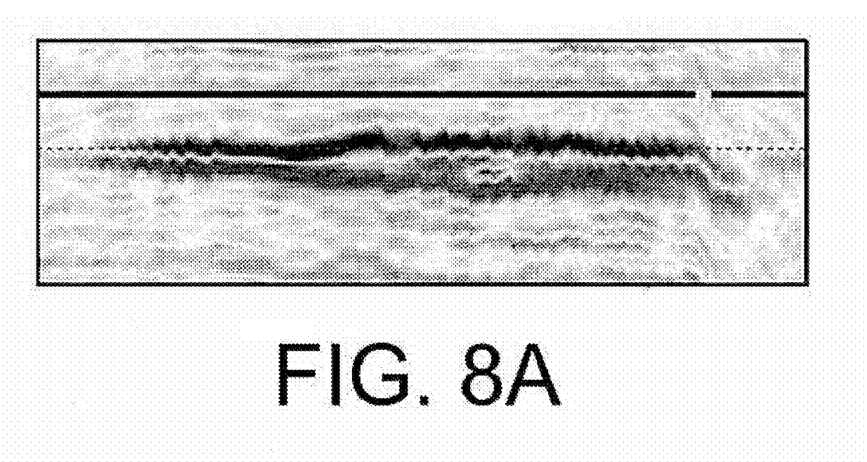
FIGS. 8A and 8B illustrate the flattened versions of FIGS. 4A and 4B, according to one or more embodiments of the invention.
Figure 8B:
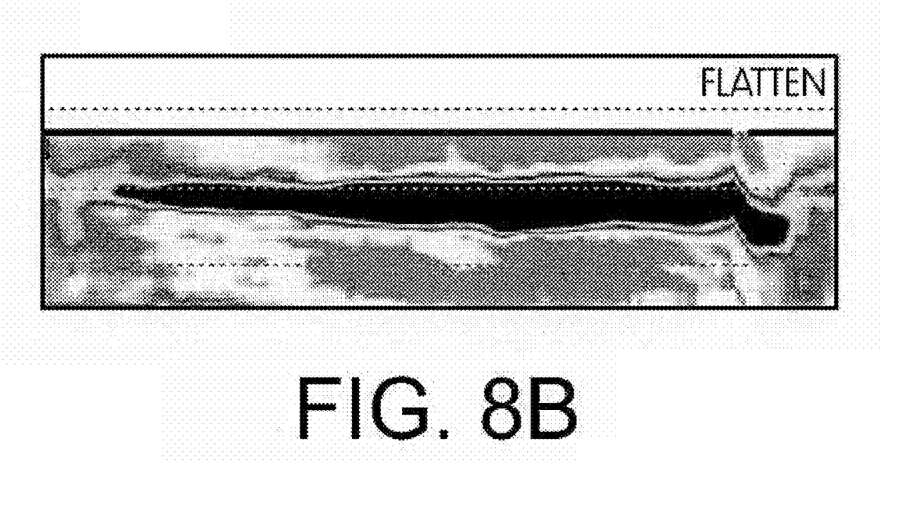

Referring back to FIG. 6, at operation 44, the mean of the values for the acoustic or elastic impedance corresponding to the micro layers is taken. In one embodiment, operation 44 includes "flattening" the set of impedance parameter data to facilitate the averaging required to determine the mean of actual values of the impedance parameters within the micro layers defined at operation 34. "Flattening" this data means stretching the data so that layers and/or horizons depicted in the data become generally horizontal, rather than tilted and/or curved. By way of illustration, FIGS. 8A and 8B show flattened versions of the sections of the seismic and impedance parameter data representing B2 shown in FIG. 4.

Figure 9:
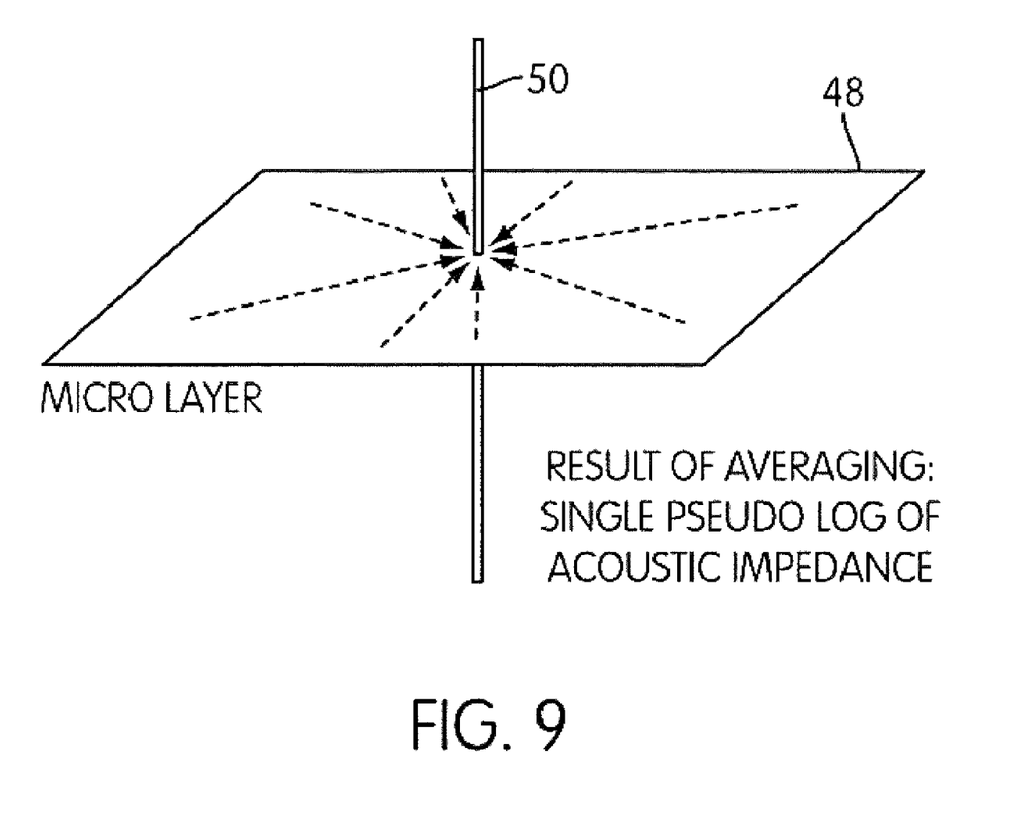
FIG. 9 illustrates a correlation of pseudo-logs related to acoustic impedance between two separate basins identified in FIGS. 1 and 2, according to one or more embodiments of the invention.

By way of illustration, FIG. 9 shows schematically the process of taking the mean of the acoustic or elastic impedance when the seismic data are three dimensional. For simplicity, the micro layer 48 is shown horizontal/flattened; in practice it can be curved. In one embodiment for three dimensional data, taking the mean of the acoustic or elastic impedance is performed over all available azimuths. In one embodiment for two dimensional data, the mean is taken in the single plane of the data. The operation of taking the mean is performed successively for each basin of interest, identified at step 24. For each basin, the mean value obtained for each micro layer is assigned to a single trace 50 referred to thereafter as a pseudo log of acoustic or elastic impedance. A vertical trace 50 indicates a trace through the set of seismic data. The x-y position of trace 50 becomes irrelevant with respect to the impedance parameter because no matter what the x-y position of trace 50 is the value of the impedance parameter along the trace is the average determined for that micro-layer in the data set of operation 44.

Referring back to FIG. 6, at an operation 52, pseudo logs of impedance data are obtained from each basin to be correlated. As was set forth above, the pseudo log is an accumulation of the average values determined for a given micro-layer in operation 44.

At an operation 54, geological markers (e.g., condensed sections) are identified and correlated between basins from the pseudo logs obtained at operation 52. There will likely be a relatively large range of actual values for the impedance parameter a surface within a micro layer in the zone of interest of the seismic volume that is not a condensed section, with the actual values being centered around a baseline measurement (corresponding to zero acoustic impedance). As a result, determination at operation 44 of a mean for the values of the acoustic or elastic impedance parameter within a micro layer that is not within or simply a condensed section will result in an average value for the impedance parameter that is close to the baseline measurement (e.g., corresponding to zero acoustic impedance). Conversely, as was set forth above, condensed sections tend to have rock properties (reflected in the impedance parameter) that are relatively homogeneous. Accordingly, there will typically be relatively little deviation between the value for the impedance parameter of a micro layer within a condensed section and the actual values of the impedance parameter. Further, due to the homogeneity within condensed sections, the actual values of the impedance parameter will likely not be centered around the baseline measurement. As a result, the average values of the impedance parameter of the pseudo logs taken at operation 44 corresponding to condensed sections will be substantially greater than and/or less than the baseline measurement, while the average values of the impedance parameter taken at operation 44 within micro layers that are not part of condensed sections will generally be substantially equivalent to the baseline measurement.

Figure 10:
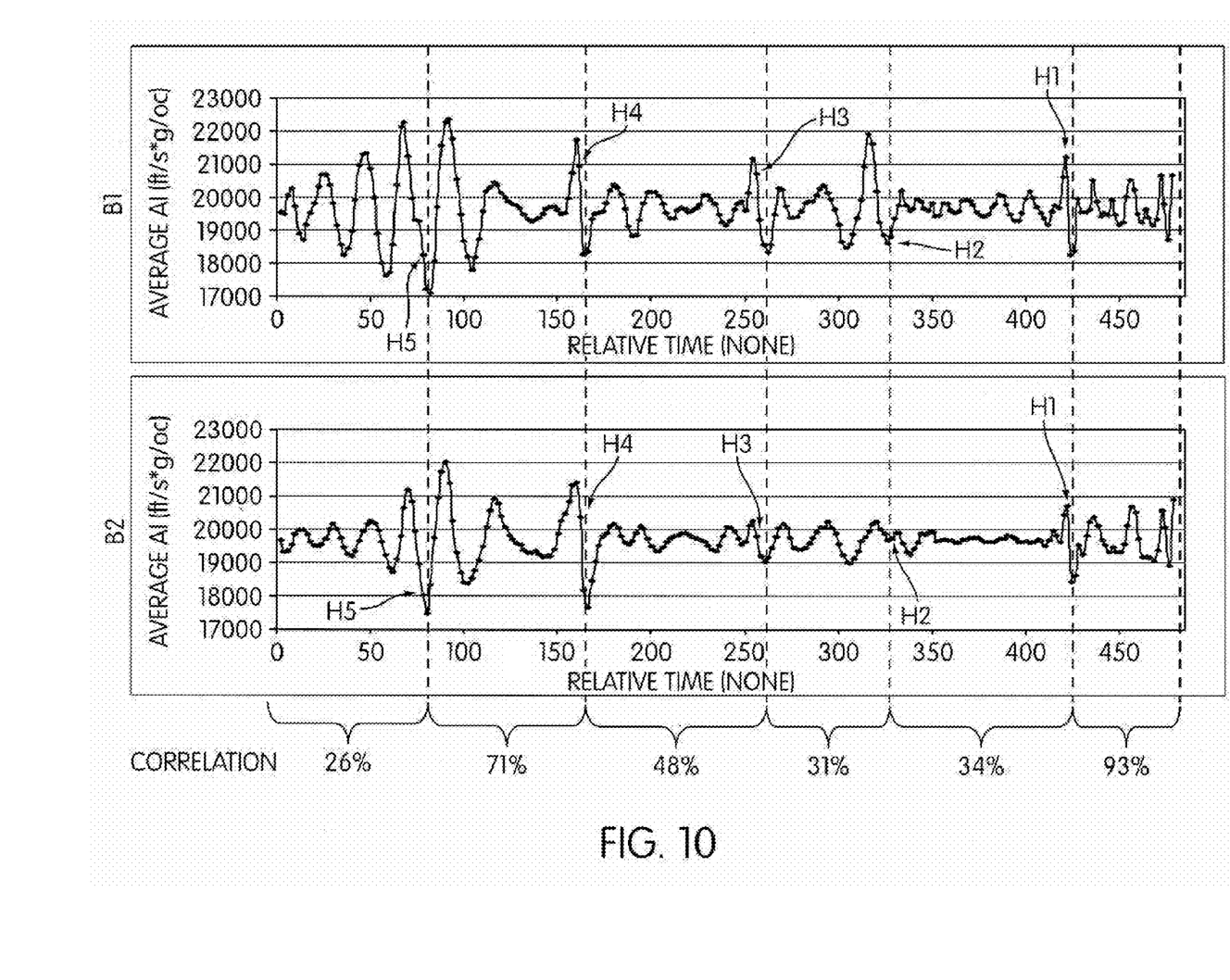
FIG. 10 illustrates a correlation of impedance information between two separate basins, according to one or more embodiments of the invention.

The evaluation of pseudo logs of acoustic or elastic impedance facilitates the correlation 54 between the separate basins (or sub-basins) of interest within the seismic data volume. For example, FIG. 10 provides a comparison of the pseudo logs of acoustic impedance parameter evaluated through each of first basin B1 and second basin B2. Because of the processing provided by method 44, horizons in first basin B1 that correspond to horizons H1-H6 in B2 can be correlated as indicated (with the correlation coefficients provided).

Figure 11:
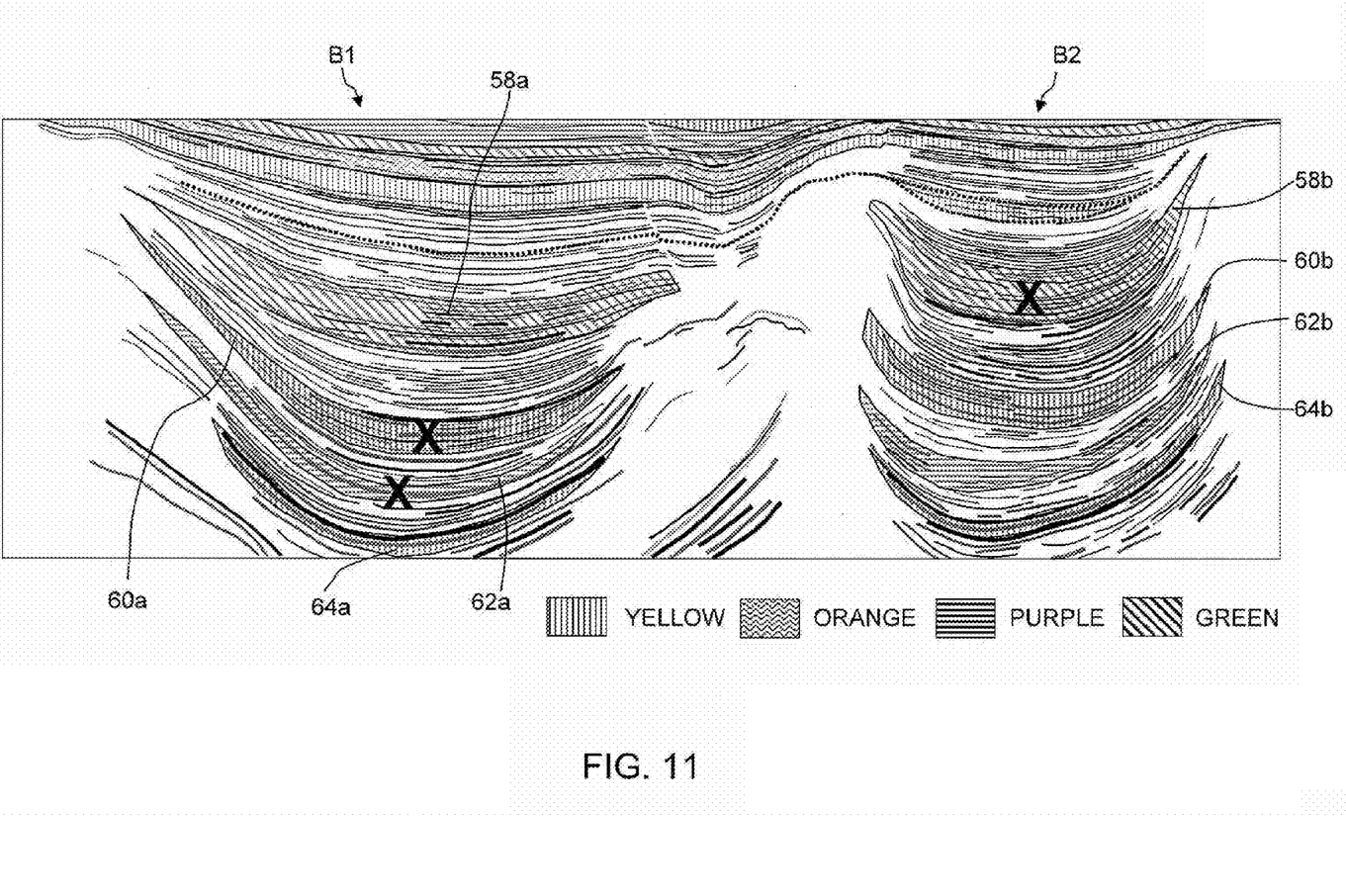
FIG. 11 illustrates an initial interpretation of seismic data from two basins, in accordance with one or more embodiments of the invention.
Figure 12:
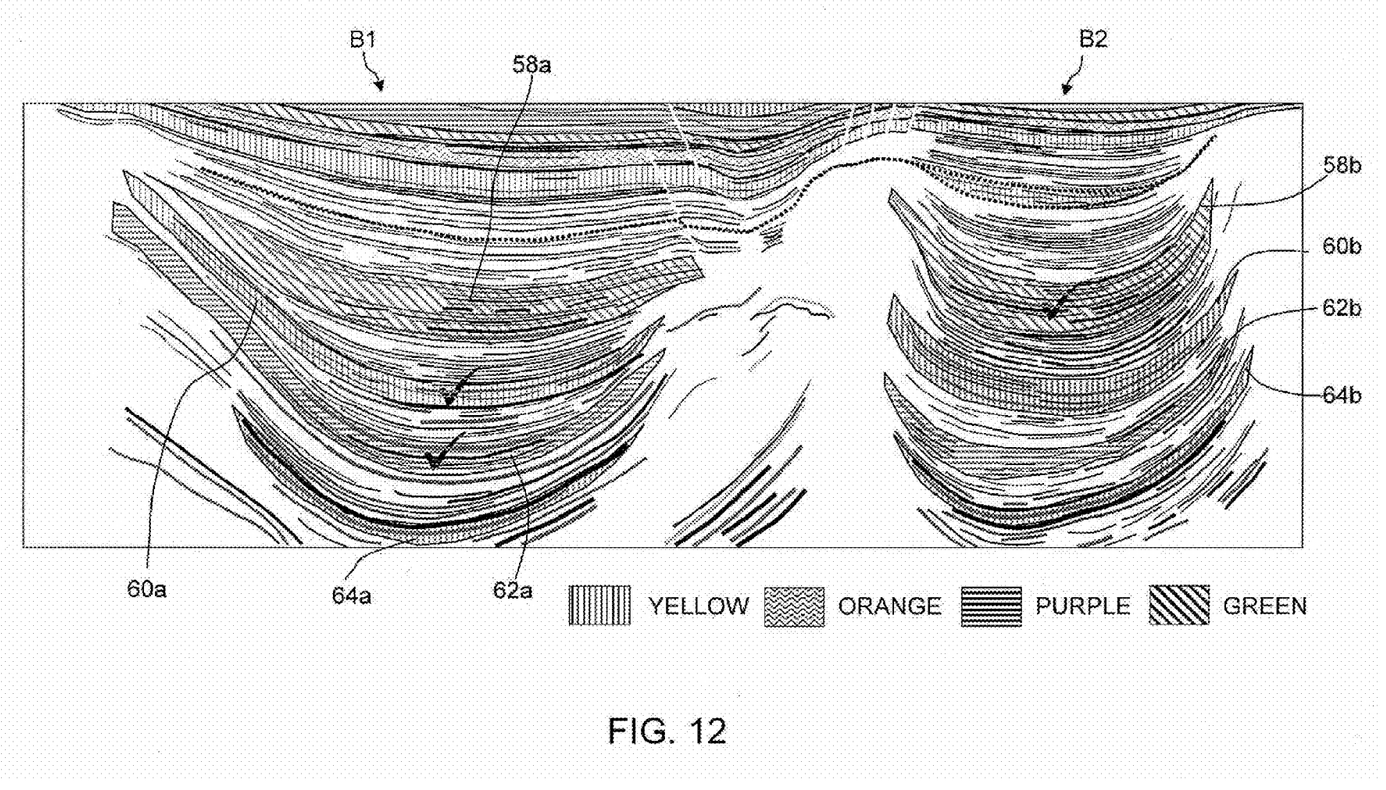
FIG. 12 illustrates an adjusted interpretation of seismic data from two basins, according to one or more embodiments of the invention.

Returning to FIG. 6, at an operation 56, once the evaluation of pseudo logs has facilitated the correlation of layers, the overall interpretation of the seismic volume of interest is updated in accordance with the correlation results. For example, FIG. 11 illustrates a view of seismic data cube 10 showing an initial interpretation of the seismic data in which areas 58a, 60a, 62a, and 64a in first basin B1 are correlated with areas 58b, 60b, 62b, and 64b in second basin B2. However, upon performance of method 20, the seismic data was reinterpreted, resulting in the interpretation shown in FIG. 12 in which each of areas 60a, 62a, and 58b is reconfigured in accordance with the correlation results of operation 54.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of providing correlation between depositionally equivalent subsurface events between separate basins, the method comprising:
   (a) obtaining a set of seismic amplitude data representing a seismic volume of interest acquired in a deep water environment, wherein the dimensions of the set of seismic data are (i) a two-dimensional position on a surface plane of the seismic volume of interest, (ii) a parameter related to seismic time and (iii) a parameter related to the amplitude derived from the signal arriving at a point in the data set defined by (i) and (ii);
   (b) identifying a plurality of basins in the volume of seismic amplitude data, the plurality of basins including a first basin and a second basin;
   (c) obtaining values for an impedance parameter related to one or both of acoustic and/or elastic impedance for locations within the volume of seismic data;
   (d) identifying stratigraphic layers within the first basin;
   (e) identifying stratigraphic layers within the second basin;
   (f) introducing micro-layers in between and/or within the stratigraphic layers identified in (d) for the first basin and (e) for the second basin,
   (g) taking the mean of the impedance parameter within each micro layer;
   (h) obtaining a pseudo log for each of the first basin and the second basin including the mean values obtained at (g);
   (i) correlating the pseudo log for the first basin with the pseudo log for the second basin; and
   (j) adjusting an interpretation regarding the continuity of the layers between the first basin and the second basin based on the correlation performed at (i).

2. The method of claim 1, wherein the first basin and the second basin are sub-basins within a common depositional environment.

3. The method of claim 1, wherein the impedance parameter is either the acoustic impedance, the elastic impedance or the shear impedance.

4. The method of claim 1, wherein the micro layers in each basin are flattened prior to taking the mean at (g).

5. The method of claim 1, wherein the plurality of basins identified at (b) comprises a third basin, and wherein the method further comprise:
- identifying stratigraphic layers within the third basin;
- introducing micro-layers in between and/or within the stratigraphic layers identified for the third basin,
- taking the mean of the impedance parameter within each micro layer;
- obtaining a pseudo log for the third basin;
- correlating the pseudo log for the third basin with the pseudo log for the first and/or second basins;
- adjusting the interpretation regarding the continuity of the layers between the third basin and one or both of the first basin and/or the second basin based on the performed correlation.

6. The method of claim 1, wherein the seismic data set has been acquired in a region where continuous and homogeneous layers can be identified.

7. A system configured to provide correlation between depositionally equivalent subsurface events between separate basins, the system comprising:
- one or more processors, the one or more processors providing a correlation between depositionally equivalent subsurface events between separate basins by:
  - (a) obtaining a set of seismic amplitude data representing a seismic volume of interest acquired in a deep water environment, wherein the dimensions of the set of seismic data are (i) a two-dimensional position on a surface plane of the seismic volume of interest, (ii) a parameter related to seismic time and (iii) a parameter related to the amplitude derived from the signal arriving at a point in the data set defined by (i) and (ii);
  - (b) identifying a plurality of basins in the volume of seismic amplitude data, the plurality of basins including a first basin and a second basin;
  - (c) obtaining values for an impedance parameter related to one or both of acoustic and/or elastic impedance for locations within the volume of seismic data;
  - (d) identifying stratigraphic layers within the first basin;
  - (e) identifying stratigraphic layers within the second basin;
  - (f) introducing micro-layers in between and/or within the stratigraphic layers identified in (d) for the first basin and (e) for the second basin,
  - (g) taking the mean of the impedance parameter within each micro layer;
  - (h) obtaining a pseudo log for each of the first basin and the second basin including the mean values obtained at (g);
  - (i) correlating the pseudo log for the first basin with the pseudo log for the second basin; and
  - (j) adjusting an interpretation regarding the continuity of the layers between the first basin and the second basin based on the correlation performed at (i).

8. The system of claim 7, wherein the first basin and the second basin are sub-basins within a common depositional environment.

9. The system of claim 7, wherein the impedance parameter is either the acoustic impedance, the elastic impedance or the shear impedance.

10. The system of claim 7, wherein the micro layers in each basin are flattened prior to taking the mean at (g).

11. The system of claim 7, wherein the plurality of basins identified at (b) comprises a third basin, and wherein the processor further provides a correlation between depositionally equivalent subsurface events between separate basins by:
- identifying stratigraphic layers within the third basin;
- introducing micro-layers in between and/or within the stratigraphic layers identified for the third basin,
- taking the mean of the impedance parameter within each micro layer;
- obtaining a pseudo log for the third basin;
- correlating the pseudo log for the third basin with the pseudo log for the first and/or second basins; and
- adjusting the interpretation regarding the continuity of the layers between the third basin and one or both of the first basin and/or the second basin based on the performed correlation.

12. The system of claim 7, wherein the seismic data set has been acquired in a region where continuous and homogeneous layers can be identified.

* * * * *